United States Patent
Ohta et al.

(10) Patent No.: US 7,986,496 B2
(45) Date of Patent: Jul. 26, 2011

(54) DISK DRIVE DEVICE AND RAMP USED THEREFOR

(75) Inventors: Katsuhiko Ohta, Tokyo (JP); Kohji Takahashi, Kanagawa (JP); Satoshi Matsumura, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 741 days.

(21) Appl. No.: 12/072,744

(22) Filed: Feb. 27, 2008

(65) Prior Publication Data
US 2008/0204925 A1 Aug. 28, 2008

(30) Foreign Application Priority Data
Feb. 27, 2007 (JP) ................................. 2007-047816

(51) Int. Cl.
*G11B 21/12* (2006.01)
(52) U.S. Cl. .................................................... 360/254.8
(58) Field of Classification Search ................. 360/254.8
See application file for complete search history.

(56) References Cited

U.S. PATENT DOCUMENTS

| 6,507,460 B2* | 1/2003 | Fayeulle et al. | 360/254.8 |
| 2001/0015875 A1* | 8/2001 | Ohta et al. | 360/254.8 |
| 2001/0033460 A1* | 10/2001 | Fayeulle et al. | 360/254.8 |
| 2002/0131212 A1* | 9/2002 | Yanagihara-shi | 360/254.8 |
| 2004/0184194 A1* | 9/2004 | Hawwa et al. | 360/254.7 |
| 2005/0018353 A1* | 1/2005 | Tsukahara | 360/254.8 |
| 2005/0088782 A1* | 4/2005 | Horio et al. | 360/254.8 |
| 2006/0044696 A1* | 3/2006 | Arikawa | 360/254.8 |
| 2006/0132980 A1* | 6/2006 | Kim et al. | 360/254.8 |
| 2006/0268462 A1* | 11/2006 | Ohwe | 360/254.8 |
| 2007/0081273 A1* | 4/2007 | Kim et al. | 360/254.8 |

FOREIGN PATENT DOCUMENTS
JP 2000-298964 A 10/2000
JP 2001-101814 A 4/2001

* cited by examiner

*Primary Examiner* — Mark Blouin (57) ABSTRACT

Embodiments of the present invention help to prevent data error occurrence in a hard disk drive by reducing the generation of dust caused by friction between a magnetic disk and a ramp. According to one embodiment, a hard disk drive comprises an enclosure, a motor for rotating a magnetic disk, an actuator for supporting a head slider for accessing the disk, and a ramp for loading/unloading the head slider disposed in the enclosure. The ramp comprises a tab slide formed of a resin material having a sliding characteristic to slide a tab at a tip end of the actuator at a specific velocity, and a slit on which a reinforcement made of a resin material with higher mechanical strength than the tab slide is formed.

14 Claims, 9 Drawing Sheets

DISK DRIVE DEVICE AND RAMP USED THEREFOR

CROSS-REFERENCE TO RELATED APPLICATION

The instant nonprovisional patent application claims priority to Japanese Patent Application No. 2007-047816 filed Feb. 27, 2007 and which is incorporated by reference in its entirety herein for all purposes.

BACKGROUND OF THE INVENTION

Data storage devices using various kinds of media such as an optical disk and a magnetic tape have been known in the art. In particular, a hard disk drive (HDD) has been widely used as a storage device of a computer and has been one of indispensable storage devices for current computer systems. Moreover, the HDD has found widespread applications such as a removable memory used in a moving image recording/reproducing apparatus, a car navigation system, a cellular phone, and a digital camera, as well as the computer, due to its outstanding characteristics.

A magnetic disk used in the HDD has a plurality of data tracks concentrically formed, and respective data tracks are divided into a plurality of sectors. On the recording surface of the magnetic disk servo data are recorded discretely in the circumferential direction. A spindle motor rotates the magnetic disk and a head element portion of a thin film element accesses a desired address position in accordance with the servo data to write/read data to/from the magnetic disk.

The head element portion is fixed to a head slider and these constitute a head. The head is attached to a suspension. The head slider flies over the rotating magnetic disk to position the head or the head element portion to a desired position above the magnetic disk. In a data reading process, a signal processing circuit performs predetermined signal processes such as waveform shaping and decoding on signals read out by the head from the magnetic disk and sends them to a host. The signal processing circuit also performs predetermined signal processes on transferred data from the host and writes them onto the magnetic disk.

A HDD, in particular a HDD used for such as a notebook, a car navigation system, or a mobile purpose, sometimes receives a strong external impact. If it receives a strong external impact, the head is lifted off from the magnetic disk by more than a prescribed fly-height to cause a data error that writing data and/or reading data cannot be performed, for example. Or, the head contacts the magnetic disk to scratch the magnetic disk or cause a head crash at worst. Accordingly, in the HDD used for a purpose in which a strong impact is likely to be applied, various measures against data error, a breakage of the magnetic disk, a head crash, and the like have been taken to attempt to improve impact resistance.

As one of the measures against an impact to the HDD, the loading/unloading scheme that retracts the head from above the magnetic disk in a non-operation time has been adopted. In the loading/unloading scheme, a ramp is used. The ramp has comb-like slits through which the magnetic disks pass and tab slides on which tabs of an actuator slide. This ramp is disposed at a side of the magnetic disks so that the slits overlap parts of the outer ends of the magnetic disks. The tabs on the tip end of the suspension ride on the tab slides so that the heads are retracted to the outside of the magnetic disks. Thereby, if any impact is applied during a non-operation time, a crash of the magnetic disk and the head is avoided.

In a HDD with the loading/unloading scheme, a data error occurrence problem has been observed even if such a strong impact as described above has not been applied. Oscillation of the rotating magnetic disk sometimes causes contact of the disk with the ramp in an operating HDD to scrape off the ramp. If the ramp is scraped off like this, dusts are generated within an enclosure of the HDD. The dust particles are spattered over the disk and if the head performs reading or writing operations in this state, the head rides on the dust particles so that an error may occur.

It has now been revealed that such contact of the magnetic disk and the ramp is raised by a smaller impact than the foregoing strong impact. Japanese Patent Publication No. 2001-101814 ("Patent Document 1") discloses an example that a squeeze plate for eliminating oscillation in the rotational axis direction of the magnetic disk, is provided at the outer diameter side of the magnetic disk to eliminate oscillation of the magnetic disk and prevent the magnetic disk and the ramp from contacting each other.

If a squeeze plate can eliminate oscillation of the magnetic disk as described in the Patent Document 1, contact of the magnetic disk and the ramp can be prevented. Consequently, it is supposed to prevent that the rotating magnetic disk contacts the ramp to scrape it. However, providing a squeeze plate causes an increase of the number of components. Besides, in the HDD with a design that the squeeze plate is not used, contact between the magnetic disk and the ramp cannot be avoided. Although the squeeze plate eliminates the oscillation of the magnetic disk, if the magnetic disk and the ramp contact with each other, there still remains the problem that the ramp will be scraped off.

Therefore, it is desired to prevent occurrence of data error by decreasing generation of the dusts due to the contact of the magnetic disk and the ramp caused by a relatively small impact and thereby to improve impact resistance during operation of the HDD.

BRIEF SUMMARY OF THE INVENTION

Embodiments of the present invention help to prevent data error occurrence in a hard disk drive by reducing the generation of dust caused by friction between a magnetic disk and a ramp. According to the embodiment of FIG. 3, a hard disk comprises an enclosure 102, a motor 103 for rotating a magnetic disk 101, an actuator 106 for supporting a head slider 105 for accessing the disk 101, and a ramp 115 for loading/unloading the head slider 105 disposed in the enclosure. The ramp 115 comprises a tab slide 150 formed of a resin material having a sliding characteristic to slide a tab at a tip end of the actuator at a specific velocity, and a slit 152 on which a reinforcement 201 made of a resin material with higher mechanical strength than the tab slide 150 is formed.

DETAILED DESCRIPTION OF THE INVENTION

Embodiments of the present invention relate to a disk drive device and a ramp used therefor, and more particularly, to a technique for reducing dusts generated by friction of a disk and the ramp.

A disk drive device according to an aspect of embodiments of the present invention comprises an enclosure, a motor disposed in the enclosure for rotating a disk, an actuator for supporting a head for accessing the disk and for moving the head by pivoting, and a ramp for loading/unloading the head to/from the disk. The ramp comprises a tab slide on which a tab of the actuator rides and slides, a slit through which an end of the rotating disk passes, and a reinforcement formed on an area facing the disk in the slit and made of a resin material with higher mechanical strength than the tab slide. Since the reinforcement is made of a resin material with high mechanical strength, it is hardly to be scraped off even if the rotating recording disk oscillates due to an external impact to contact it, so that generation of dust is prevented.

Another aspect of embodiments of the present invention is a ramp disposed in a disk drive device for loading/unloading a head for accessing a disk to/from the disk. This ramp comprises a tab slide on which a tab of an actuator for supporting the head and moving the head by pivoting rides and slides, a slit through which an end of the rotating disk passes, and a reinforcement formed on an area facing the disk in the slit and made of a resin material with higher mechanical strength than the tab slide. Since the reinforcement is made of a resin material with high mechanical strength, it is hardly to be scraped off even if the rotating recording disk oscillates due to an external impact to contact it, so that a ramp to preventing generation of dusts can be provided.

A shape of the reinforcement may be a terrace shape jutting out toward the disk. According to this shape, the top surface of the terrace-shaped reinforcement first contacts a disk when the disk oscillates. Since the reinforcement is made of a resin material with high mechanical strength, it is hardly to be scraped off even if the rotating recording disk oscillates due to an external impact to contact it.

The he reinforcement may be provided at a position outer in a radial direction of the disk than a first virtual circle which is an orbit of an outermost disk radial directional position of the head above a recording surface of the disk at a time of a first contact of the tab to the tab slide in unloading operation. Although the reinforcement is made of a resin material with high mechanical strength and is hardly to be scraped off, it may be sometimes slightly scraped off. On this occasion, the resin may attach to the disk in the contact area with the reinforcement. However, if the resin is attached to the recording surface of the disk, attachment of the resin onto the data area can be prevented because the contact area is outside of the first virtual circle according to the present configuration.

The reinforcement may be provided at a position outer in a radial direction of the disk than a second virtual circle which is an orbit of an outermost disk radial directional position of the head above a recording surface of the disk at a time when the tab rides on the tab slide and the head is lifted by more than a specific fly-height from the recording surface of the disk. In this way, since at the outside of the second virtual circle the head is lifted by more than the specific fly-height from the recording surface of the disk, a sufficient spacing is provided between the head and the recording surface of the disk. Therefore, if the reinforcement is provided outside of the second virtual circle, the attached resin can be prevented from contacting the head even if the resin of the reinforcement is attached to the disk.

A shape of an end of the reinforcement in a direction toward a rotational axis of the disk may be a shape along a circumference of the magnetic disk at a position of the end. This shape enables to contact the disk in a largest possible area to prevent generation of dust effectively.

The end of the reinforcement in a direction toward the rotational axis of the disk may be provided between a first virtual circle and a second virtual circle. This configuration allows the contact area of the reinforcement and the disk to expand and the attached resin on the disk to contact the head together to some extent.

A groove may be provided in an area facing an edge of the disk end in the slit. A contact with a high contact pressure is preferably avoided even at the reinforcement. Furthermore, such a contact with a high contact pressure is preferably avoided in the area other than the reinforcement. This configuration with a groove in an area facing the edge of the disk can avoid a contact with the edge with a high contact pressure.

According to embodiments of the present invention, the ramp is prevented from being scraped off due to contact with the disk by an external impact, so that the amount of the generated dusts decreases.

Hereinafter, particular embodiments of the present invention will be described. For clearness of explanation, the following description and the accompanying drawings contain omissions and simplifications as appropriate. Throughout the drawings, the like components are denoted by like reference numerals, and their repetitive description is omitted if not necessary for the sake of clearness.

Figure 1A:
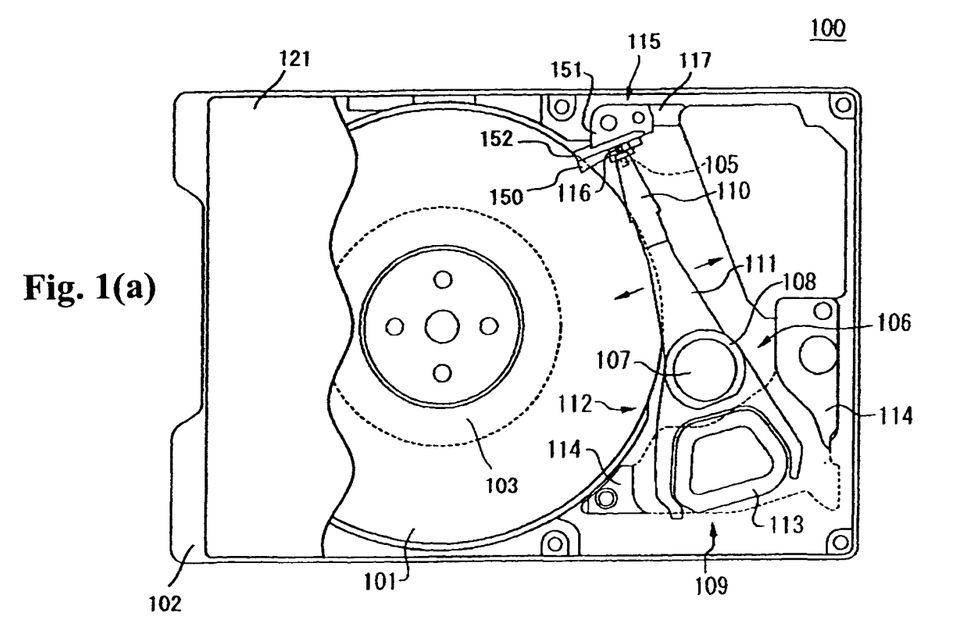
FIG. 1(a) is a plan view schematically showing the entire configuration of the hard disk drive according to one embodiment.
Figure 1B:
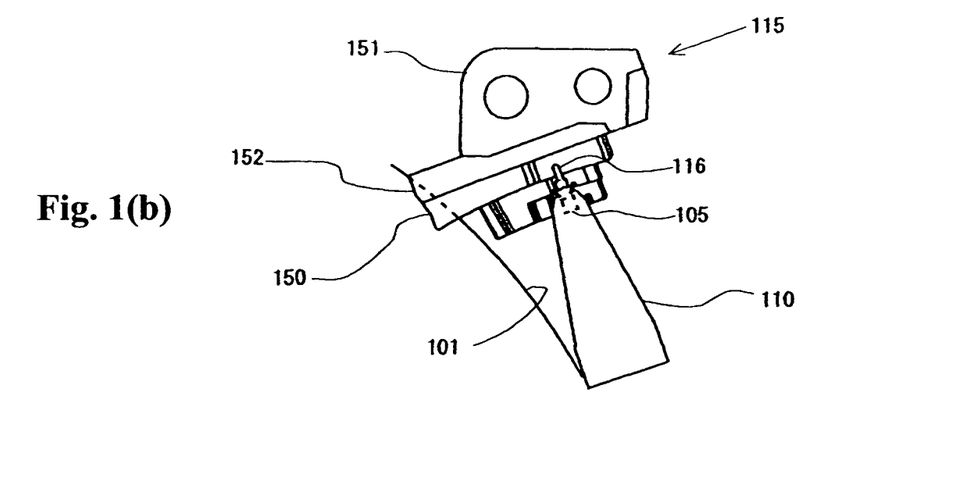
FIG. 1(b) is a plan view in which the periphery of the ramp and the suspension is enlarged.

Various embodiments to which the present invention is applied will be described in detail referring to the drawings. Certain embodiments relate to a ramp structure in a disk drive device. First, an entire configuration of an HDD as an example of a disk drive device will be outlined. FIG. 1(*a*) is a plan view schematically showing an HDD 100 according to the one embodiment. FIG. 1(*b*) is a plan view in which the periphery of a ramp 115 and a suspension 110 is enlarged. In FIG. 1, a base 102 is fixed with a top cover 121 to cover a top opening of the base 102 and a gasket (not shown) interposed therebetween to form an enclosure for housing the components of the HDD 100.

A spindle motor 103 rotates a magnetic disk 101 at a specific angular rate. The magnetic disk 101 is a non-volatile recording disk for storing data by magnetizing a magnetic layer. A head slider 105 as an example of a head includes a slider and a head element portion fixed to a surface of the slider. The head element portion comprises a recording element for converting electric signals to magnetic fields according to data to the magnetic disk 101 and/or a reproducing element for converting magnetic fields to electric signals from the magnetic disk 101.

An actuator 106 is supported pivotably about a pivotal axis 107 and is driven by a voice coil motor (VCM) 109. The actuator 106 supports the head slider 105 and pivots to position the head slider 105 to a desired position above the magnetic disk 101. The actuator 106 comprises components of a suspension 110, an arm 111, a fitting section 108 to which the pivotal axis 107 fits, a coil supporter 112, and a flat coil 113 connected in order from the tip end where the head slider 105 is disposed. An upper stator magnet support plate 114 is shown with its main part cut out for convenience and the outline is indicated by dotted lines. The VCM 109 comprises a flat coil 113, a stator magnet (not shown) fixed to the upper stator magnet support plate 114, and a lower stator magnet (not shown).

The reference numeral 115 is a ramp for retracting the head slider 105 from the magnetic disk 101. In the example of FIG. 1, the ramp 115 is disposed at a side of the outer periphery of the magnetic disk 101. At the tip end of the suspension 110, a tab 116 is formed. The ramp 115 according to the present embodiment includes a tab slide 150 to support the tab 116, a ramp supporter 151 to fix the ramp 115 to the base 102, and a slit 152 through which the outer peripheral part of the magnetic disk 101 passes. The tab slide 150 is formed so as to protrude from the surface of the ramp supporter 151 toward the actuator 106.

The HDD 100 may be equipped with one or more magnetic disks 101 arranged in a stacked manner. Typically, data are recorded on the both sides of the magnetic disk 101 but may be recorded on only one side of the magnetic disk 101. In order to read and/or write data of the magnetic disk 101, the actuator 106 moves the head slider 105 above the recording surface of the rotating magnetic disk 101. Pivoting of the actuator 106 moves the head slider 105 along the radial direction of the surface of the magnetic disk 101. The pressure by air viscosity between an air bearing surface (ABS) of the head slider facing the magnetic disk 101 and the rotating magnetic disk 101 balances to a pressure applied toward the magnetic disk 101 by the suspension 110 for the head slider 105 to fly over the magnetic disk 101 with a specific spacing.

When the magnetic disk 101 stops rotating, the actuator 106 retracts the head slider 105 from above a data area to the ramp 115. The actuator 106 pivots toward the ramp 115, the tab 116 at the tip end of the actuator 106 slides on the tab slide 150 of the ramp 115 to ride on a parking section on the ramp 115 so that the head slider 105 is unloaded. In loading, the actuator 106 supported on the parking section leaves the ramp 115 to move to above the surface of the magnetic disk 101.

Figure 2:
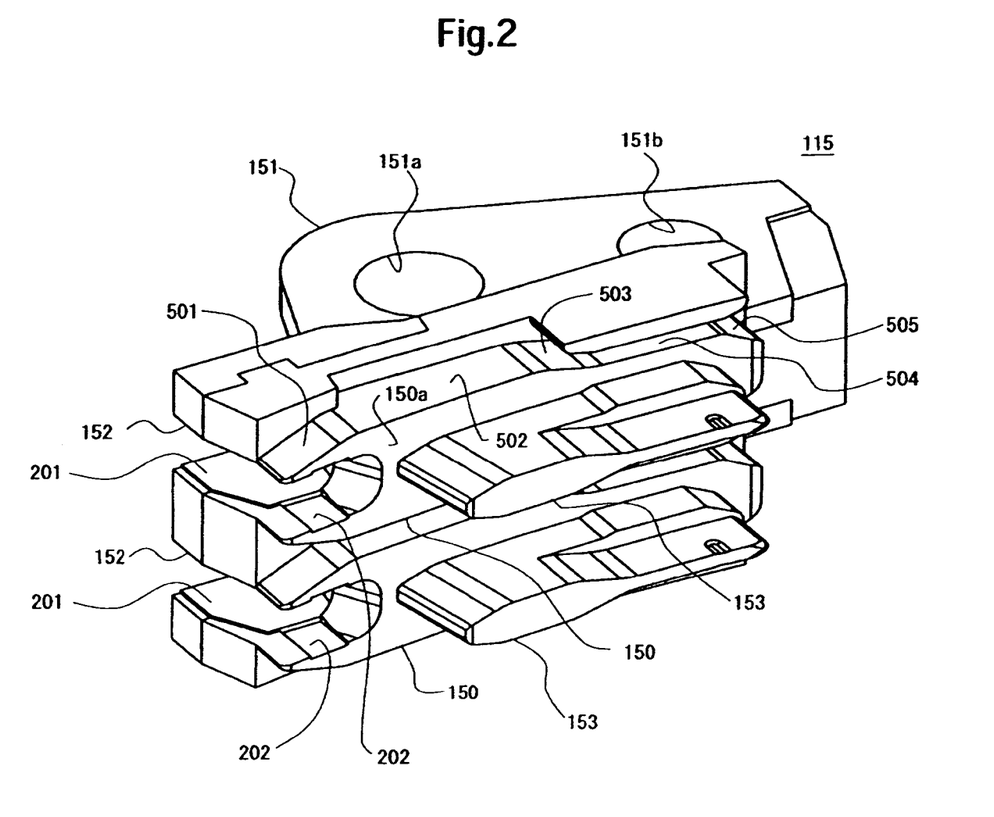
FIG. 2 is a perspective view showing the ramp according to one embodiment.
Figure 3:
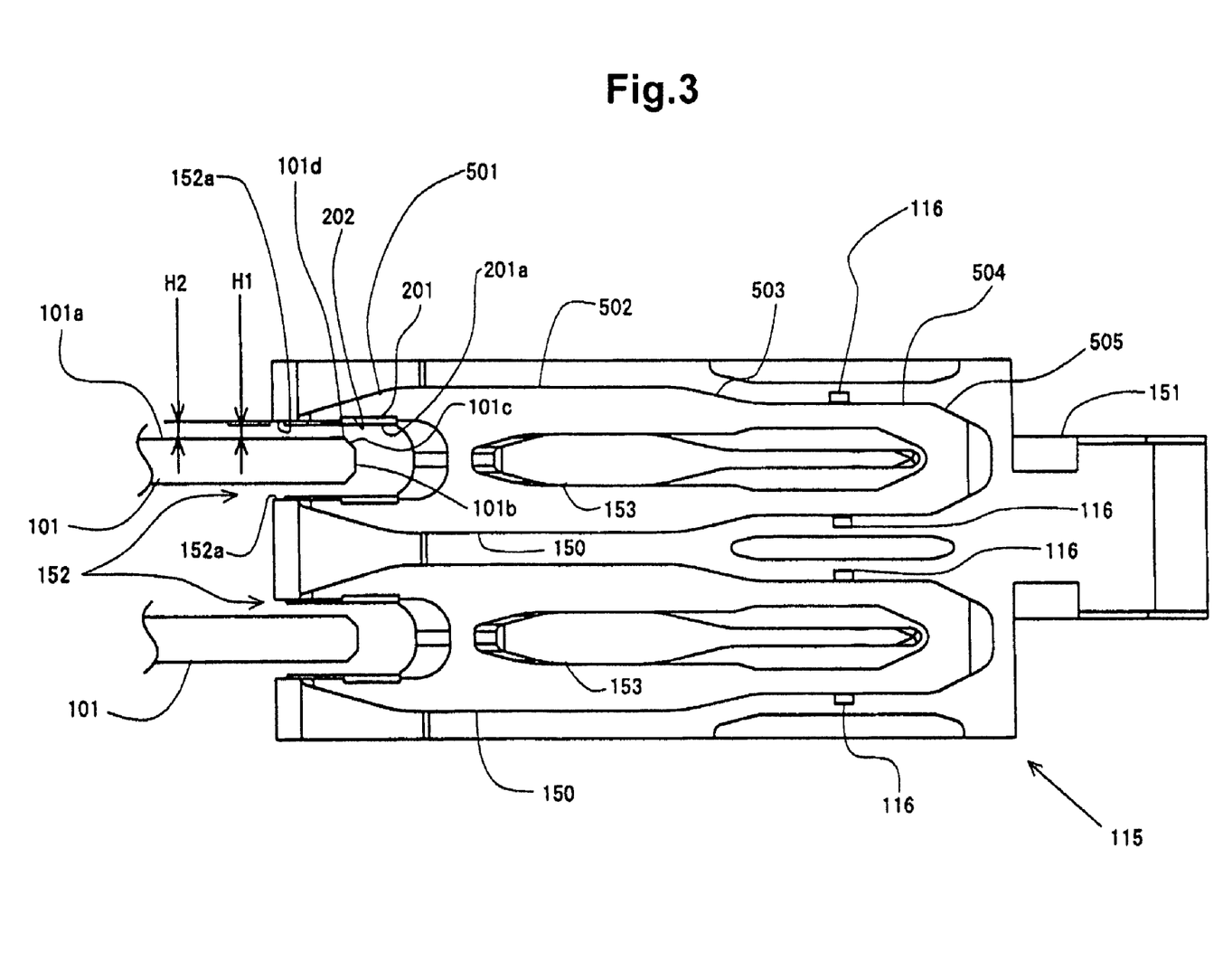
FIG. 3 is a side view showing the ramp according to one embodiment.
Figure 4:
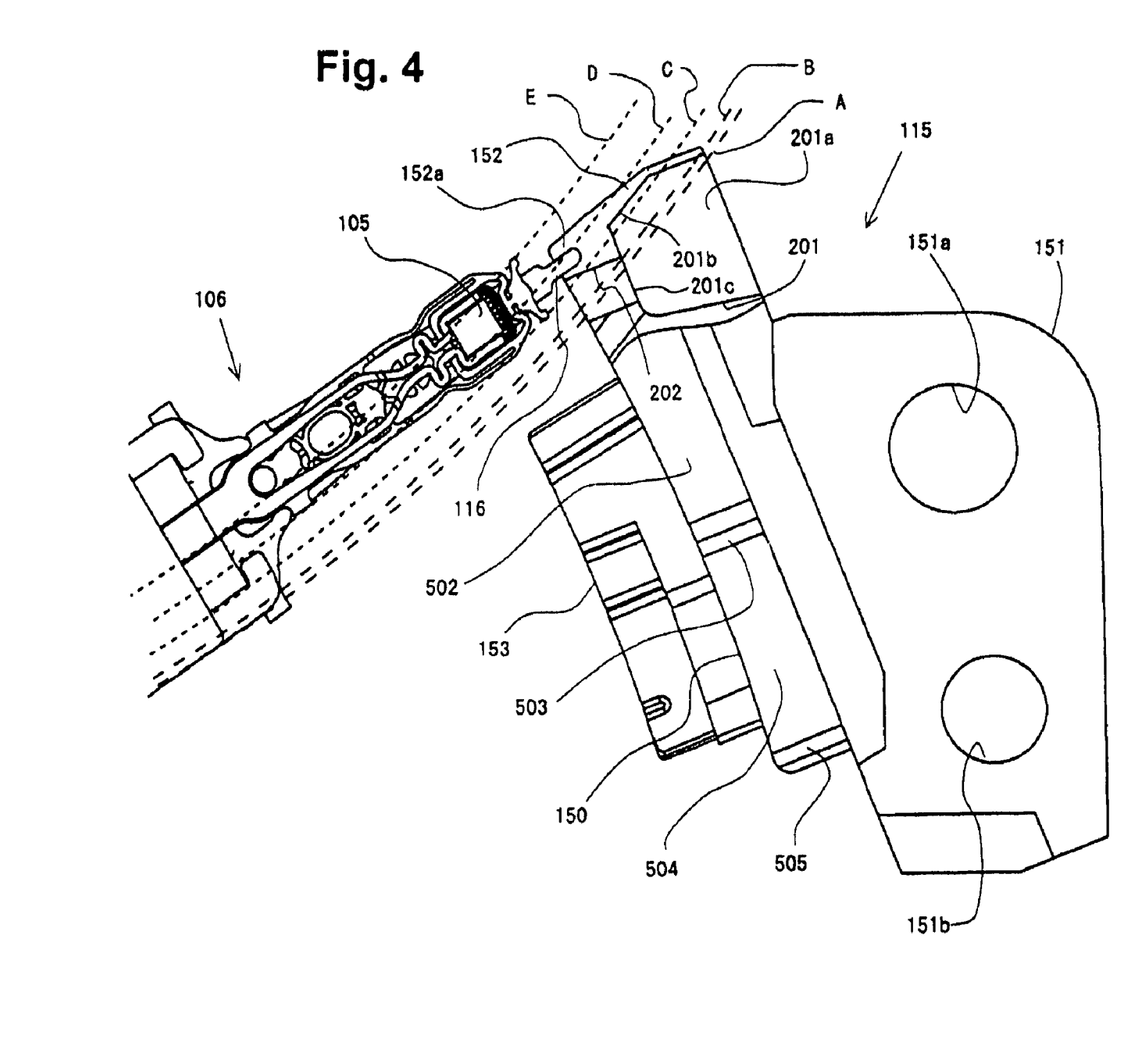
FIG. 4 is a partially notched plan view of the ramp according to one embodiment.

FIG. 2 is a perspective view showing the structure of the ramp 115. FIG. 3 is a side view of the ramp 115. FIG. 4 is a plan view in which a part of the ramp 115 is cut off. In FIG. 3, four tabs 116 at the tip end of the actuator 106 in an unloaded state are illustrated. The present embodiment exemplifies a case with two magnetic disks 101. FIG. 4 illustrates a tip end of the actuator 106 together with the ramp 115 and schematically shows the positional relationship between the tabs 116 and the head sliders 105, and the ramp 115. Hereinbelow, the configuration of the ramp 115 will be described referring to these drawings.

The ramp 115 comprises slits 152 through which the outer ends of the rotating magnetic disks 101 pass, tab slides 150 on which the tabs 116 at the tip end of the actuator 106 slide, fins 153 which protrude from sides of the tab slides 150 and function as protect plates so that the heads do not contact with each other due to vibration, for example, and a ramp supporter 151 to fix the ramp 115 to the base 102.

The slits 152 are parts through which the outer ends of the rotating magnetic disks 101 pass and the cross-section thereof is substantially a comb-like shaped. The ramp 115 is used for unloading the head from the magnetic disk 101 and loading the head to the magnetic disk 101. In loading/unloading operation, the ramp 115 must have the head slider loaded smoothly to above the magnetic disk with a specific fly-height and have the head slider 105 unloaded smoothly from above the magnetic disk 101 with the tab 116 at the tip end of the actuator 106. Hence, the ramp 115 is necessary to overlap the outer end of the magnetic disk 101. The overlapping area is the slit 152. The surface 152a forming the slit 152 and facing the recording surface 101a of the magnetic disk 101 has a reinforcement 201 and a groove 202 thereon.

The reinforcement 201 functions to prevent the ramp 115 from being scraped off even if the rotating magnetic disk 101 oscillates to contact the ramp due to an external impact. The reinforcement 201 is a terrace-shaped and juts out from the surface 152a facing the magnetic disk 101 inside the slit 152 toward the magnetic disk 101. That is, inside the slit 152, a one-layer-higher surface is formed. The cross-section of the reinforcement 201 is substantially rectangular-shaped. This reinforcement 201 is made of polyetherimide resin. The polyetherimide resin is a resin material with higher mechanical strength than placental resin of which the tab slide is made. Even if the rotating magnetic disk 101 contacts the polyetherimide resin, the scraped-off amount is very small. Conversely, if it contacts the rotating magnetic disk 101, it hardly scrapes off the magnetic disk 101.

The hardness of the reinforcement 201 is preferably from 85 to 114 in a Rockwell hardness (M-scale). For the reinforcement 201 according to the present embodiment, polyetherimide resin having a Rockwell hardness (M-scale) of 109 is used.

The top surface 201a of this terrace-shaped reinforcement 201 comes in plane contact with the magnetic disk 101 oscillated by an impact. This contact of the top surface 201a to the magnetic disk 101 prevents the top surface from being scraped and other parts inside the slit 152 from contacting the magnetic disk 101. This is effective in a case that the other parts are formed of a material having relatively lower mechanical strength. In other words, the top surface 201 first contacts the magnetic disk 101 so that the part formed of a material having relatively lower mechanical strength is prevented from being scraped.

In order that the top surface 201a may contact the oscillating magnetic disk 101 first, the spacing between the top surface 201a of the reinforcement 201 and the recording surface 101a of the magnetic disk 101 is preferably within the following range. Assuming the distance from the top surface 201a to the recording surface 101a of the magnetic disk 101 to be H1 and the distance from the facing surface 152a to the magnetic disk 101 in the slit 152 to the recording surface 101a of the magnetic disk 101 to be H2, the relationship of H2>H1>0 is preferably satisfied.

If the H1 is equal to the H2, the reinforcement 201 does not jut out so that it cannot contact the magnetic disk 101 first. If the H1 is 0, it contacts the magnetic disk 101 to disturb the rotation of the magnetic disk 101. Setting the distance between the surfaces within the above range results in setting the jutting height of the reinforcement 201 within the specific range, which can make the reinforcement 201 first contact the magnetic disk 101. In the present embodiment, the H1 is 0.185 mm and the H2 is 0.235 mm. Accordingly, the jutting height of the reinforcement 201 is 0.05 mm. The thickness of the magnetic disk 101 is 0.635 mm.

The planar shape of the top surface 201a of the reinforcement 201 is, as shown in FIG. 4, a substantial pentagon in which an oblique line 201b is provided by cutting out a part of a substantial quadrangle. The reason why the shape of the reinforcement 201 is defined as a substantially pentagon in embodiments of the present invention is as follows. First, the reinforcement 201 preferably contacts in the widest possible plane so that the contact pressure becomes as low as possible when it contacts the magnetic disk 101. One way for it will be to increase the overlapping area of the magnetic disk 101 and the reinforcement 201.

Even though the reinforcement is hardly to be scraped, however, it may be sometimes scraped off a little bit. If the reinforcement is scraped off like this, the resin forming the reinforcement may sometimes attach to the surface of the magnetic disk. Extending the overlapping area for the reinforcement to overlap the data area may cause attachment of the resin to the data area. The attached resin on the data area may cause a data error such as incapability of reading/writing data. When the head slider reaches the position where the resin has been attached, the resin may attach to the head slider, which will cause a data error, too.

The magnetic disk 101 comprises, as shown in FIG. 3, a recording surface 101a, an outermost peripheral side surface 101b, a chamfered part 101c, and an edge 101d which is a boundary between the recording surface 101a and the chamfered part 101c. In FIG. 4, the dashed line A corresponds to the outermost peripheral side surface 101b of the magnetic disk 101, and the dashed line B corresponds to the edge 101d. The dotted line D is a first virtual circle assumed to be an orbit of the position of the head slider at the radial outermost end of the disk when the tab at the tip end of the actuator first contacts the tab slide in an unloading operation. The dotted line E represents the outermost periphery of the data area.

An area at the outermost peripheral end of the magnetic disk where the loading and the unloading of the head are performed is a loading/unloading zone where the data are not written. That is, the data area is provided inner than the head position at the time when the tab first contacts the tab slide. Therefore, a position of the magnetic disk 101 radially outer than the first virtual circle of the dotted line D is at least outside of the data area.

In the present embodiment, the reinforcement 201 is provided outside of the first virtual circle of dotted line D so that the resin is attached outside of the data area even if the reinforcement is scraped off and the resin is attached to the magnetic disk.

In this case, even if the reinforcement is provided outside of the first virtual circle, it is necessary to overlap by the largest possible area in order to reduce the contact pressure as much as possible. Then, in order that the reinforcement 201 gets closer to the dotted line D, the quadrangle is cut out along the dotted line D to provide the oblique line 201b.

The dotted line C represents a second virtual circle, which will be described hereinbelow. First, the actuator is equipped with a suspension constituted by a load beam and a gimbal at the tip end thereof, and a tab is provided at the tip end of the suspension. A head is supported at the gimbal, and a limiter is provided on the load beam to limit the spacing between the load beam and the gimbal so as not to depart from each other more than a specific spacing. The head is in a state that a positive pressure and a negative pressure are balanced by an effect of the shape of the ABS of the head slider to exist above the magnetic disk keeping a specific fly-height.

When the head is unloaded from this state, the actuator moves toward the outer radial direction of the magnetic disk. After the tab at the tip end of the actuator has ridden on the tab slide of the ramp, a force is gradually applied toward the direction in which the head departs from the magnetic head in the direction of the rotational axis of the disk.

Since the head slider is in a balanced state between a positive pressure and a negative pressure, however, the head slider moves as it attempts to keep the specific fly-height for a while. At this time, the gimbal transforms to keep the position of the head. When a further force is added toward the direction of departing from the magnetic disk, the limiter starts to work to lift up the head. Then, the head slider is lifted off the magnetic disk. The assumed orbit of the head slider above the magnetic disk at the outermost position in the radial direction of the magnetic disk when the head is lifted over the specific fly-height is the second virtual circle.

Even if the resin was attached to the region radially outer than the dotted line C of the second virtual circle in the magnetic disk 101, the resin would not be attached to the head since the head is away more than the specific fly-height from the disk. In embodiments of the present invention, the reinforcement 201 may be disposed outside of the second virtual circle so that even if the reinforcement is scraped off and the resin is attached on the magnetic disk, the resin-attached area is outside of the data area and does not contact the head.

Turning to FIG. 4, the left side from a side 201c at the groove 202 side of the reinforcement 201 lies behind a first slope of the tab slide 150, which will be described later, and is formed very thin. In the fabricating method of the present embodiment, namely the double-injection molding, which will be described layer, only one resin material can be disposed on such a very thin part. Therefore, polyacetal resin must be used on this part with priority in a sliding characteristic. Hence, polyetherimide resin is allowed to be used to the boundary of the back side of the first slope of the tab slide 150. Consequently, the planar shape of the reinforcement 201 is determined to be a substantial pentagon as shown in FIG. 4. If there is no other choice than using a relatively scrapable material inside the slit 152, the ramp having a jutting reinforcement according to embodiments of the present invention is especially effective because an area with high mechanical strength contacts the rotating disk prior to other parts.

The groove 202 is provided at the position to face the edge 101d of the magnetic disk 101 in order to avoid contact with the edge 101d of the magnetic disk 101 in the slit 152. The magnetic disk 101 oscillates due to an external impact so that its outer diameter end sometimes contacts the ramp 115. Behaviors of the magnetic disk 101 in response to an application of an external impact are complex: the whole magnetic disk 101 may move toward the rotational axis to make plane contact with the ramp 115, the recording surface of the magnetic disk 101 bends and the edge 101 at the outer diameter end bounces to contact the ramp, or these behaviors are combined.

In the present embodiment, most of the remaining part of the ramp other than the reinforcement 201 is mainly made of polyacetal resin having an excellent sliding characteristic. Since this polyacetal resin has lower mechanical strength than polyetherimide resin used for the reinforcement 201, it should avoid contacting the magnetic disk 101 as far as possible. The plane contact between the magnetic disk 101 and the ramp will not be a matter because the reinforcement 201 contacts the magnetic disk prior to other parts, but in case that the magnetic disk bends, the edge 101d of the magnetic disk may contact with a part other than the reinforcement 201. Therefore, the groove is preliminary provided so as not to contact the edge 101d even if the magnetic disk bends.

Specifically, as shown in FIG. 4, the groove 202 is provided on a part which is other than the reinforcement 201 on the magnetic disk facing surface 152a in the slit 152 and faces the dashed line B indicating the edge 101d of the magnetic disk 101. That is, the groove 202 is a substantially quadrangular groove in its planar shape and is provided so that its diagonal line substantially coincides with the dashed line B. The depth of the groove 202 is preferably set to a value which enables sufficiently to avoid the contact of the edge 101d of the bending magnetic disk. In the present embodiment, it is set to 0.05 mm from the facing surface 152a and 0.1 mm from the top surface 201a of the reinforcement 201.

The tab slide 150 has a parking area 504 for supporting the tab 116 at the tip end of the actuator 106 and a slide continued to the parking area 504. The slide continued to the parking area 504 has a first slope 501, a parallel plane 502, a second slope 503, and a third slope 505.

Next, a fabricating method of the ramp 115 according to the present embodiment will be described.

In the present embodiment, the ramp 115 was fabricated by double-injection molding.

Figure 5:
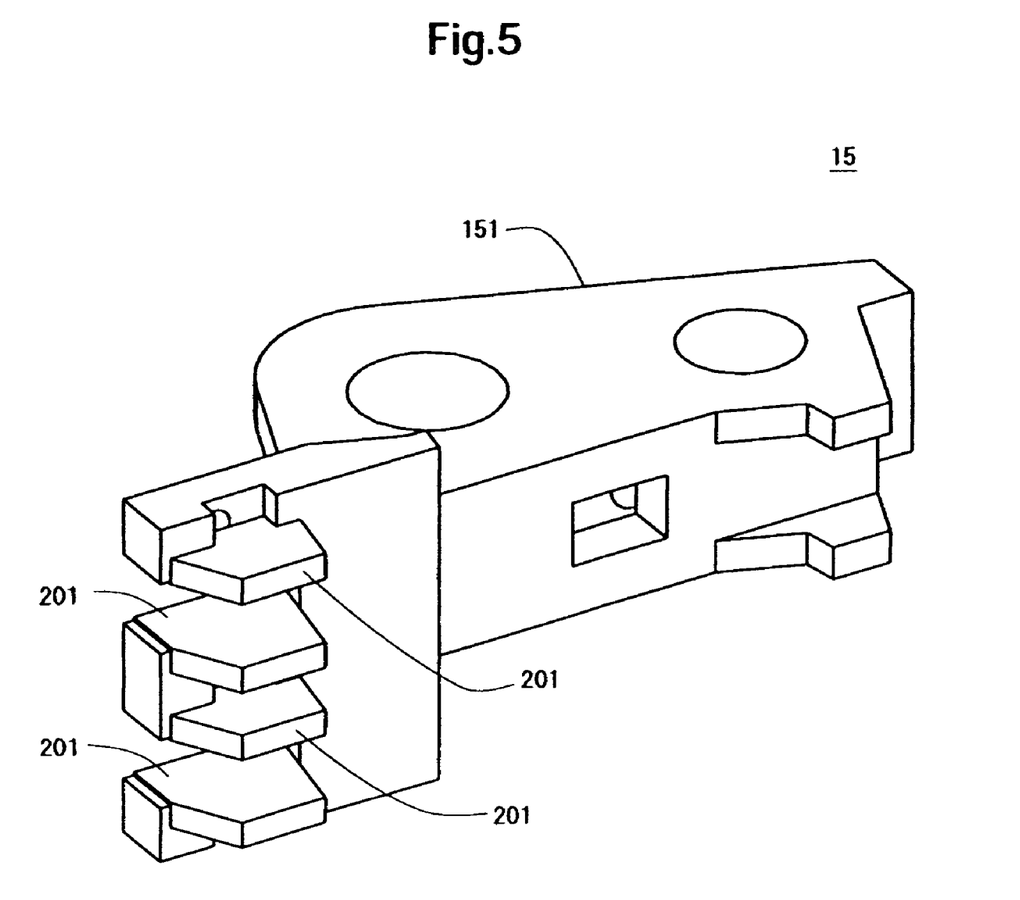
FIG. 5 is a perspective view showing the primary molding precursor of the ramp according to one embodiment.
Figure 6:
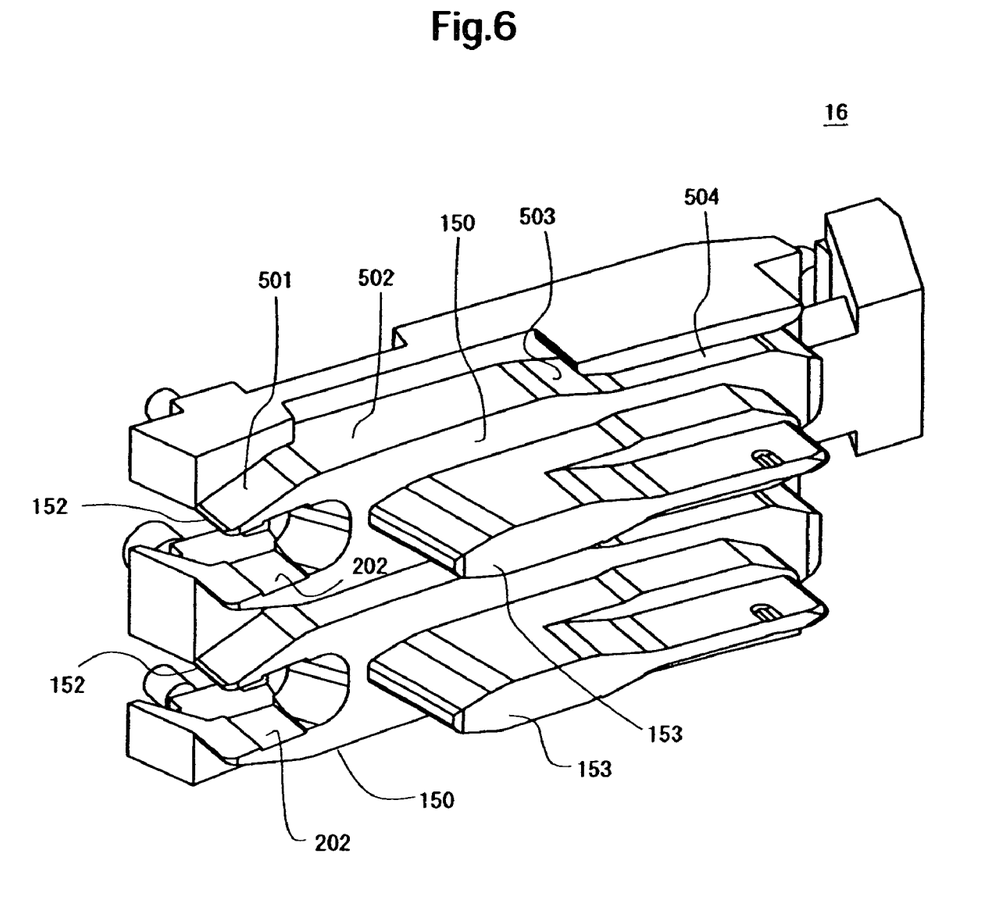
FIG. 6 is a perspective view showing the secondary molding precursor of the ramp according to one embodiment.

First, a primary molding was processed using polyetherimide resin with high mechanical strength and a secondary molding was processed using polyacetal resin with desired mechanical strength to fabricate the ramp 115. FIG. 5 illustrates a shape of a precursor 15 in the primary molding. As shown in FIG. 5, in the primary molding, specific shapes of the reinforcements 201 and the ramp supporter 151 were molded. FIG. 6 illustrates a shape of a precursor 16 in the secondary molding. As shown in FIG. 6, in the secondary molding, specific shapes of the tab slides 150 and the fins 153 were molded. According to such a double-injection molding, a ramp 115 having both of the specific mechanical strength required to the reinforcements 201 and the specific sliding characteristic required to the tab slides 150 can be fabricated with excellent production efficiency.

The fabricating method of the ramp in embodiments of the present invention is not limited to the double-injection molding but may be an insert molding or other methods.

Figure 7:
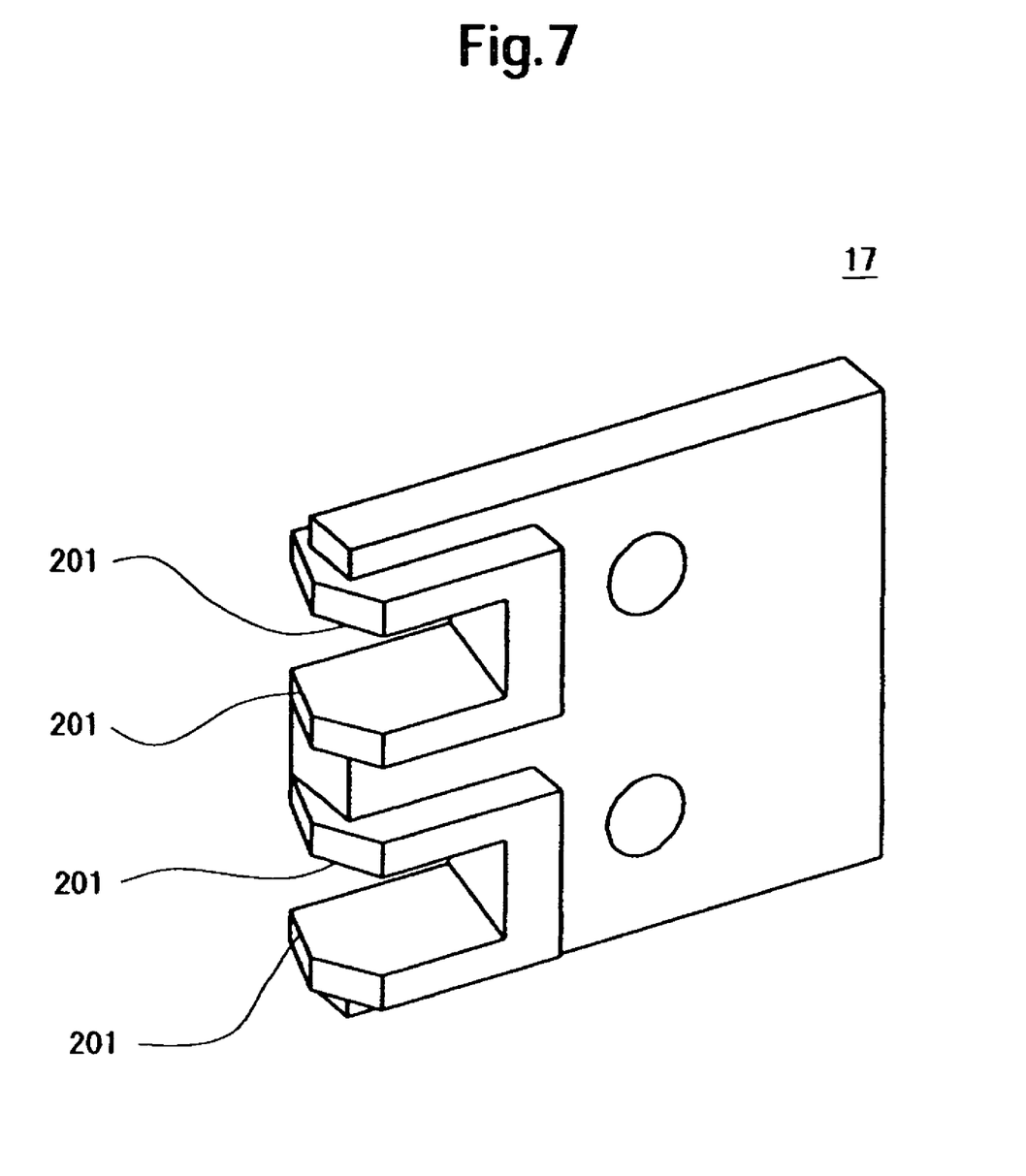
FIG. 7 is a perspective view of the insert product in forming the ramp by insert molding.
Figure 8:
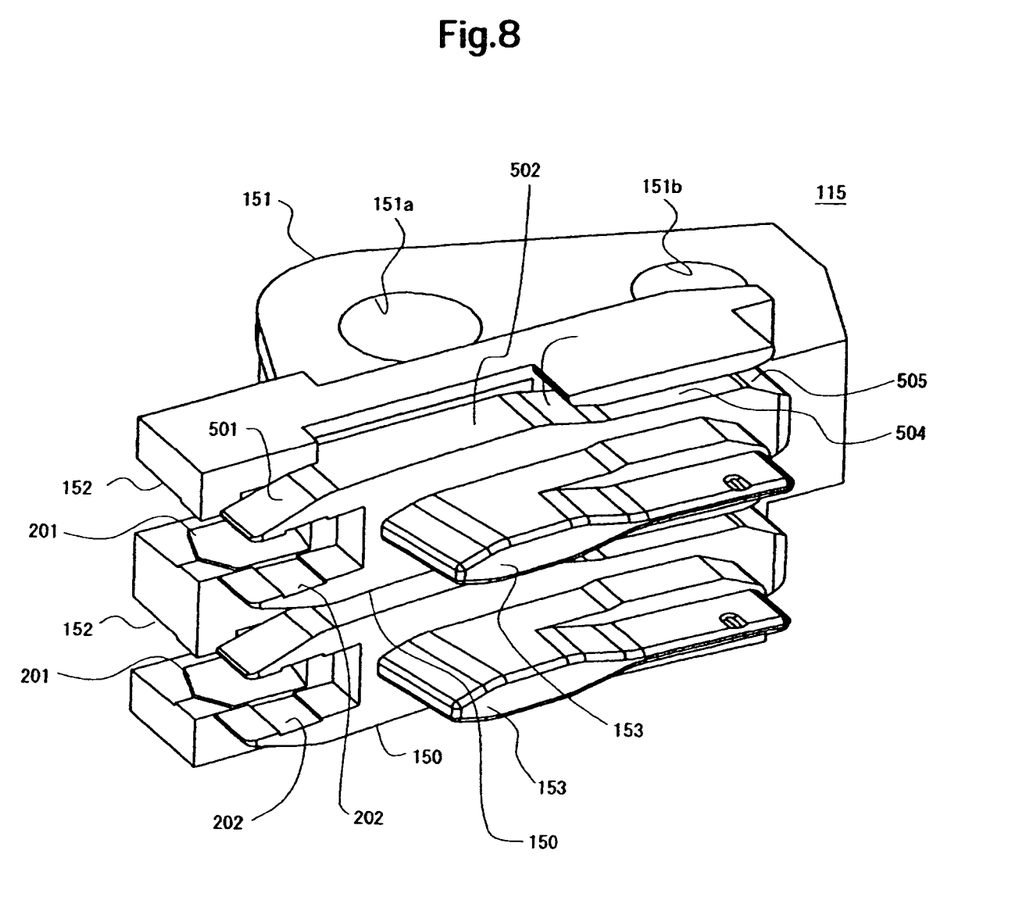
FIG. 8 is a perspective view of the ramp according to one embodiment in case of forming by insert molding.

In insert molding, for example, an insert product 17 equipped with specific shapes of reinforcements 201 as shown in FIG. 7 is fabricated with polyetherimide resin. Then, the insert product is charged into a specific mold, polyacetal resin is injected into the mold, and the insert product 17 is packed by melted polyacetal resin and is solidified to be united. The mold is preliminarily designed so as to finally obtain the ramp 115 shown in FIG. 8. In this way, the ramp according to the embodiment of the present invention shown in FIG. 8 can be fabricated.

The ramp 115 can also be fabricated by molding the whole ramp 115 with polyacetal resin and adhering a specific thickness of polyetherimide resin film to the magnetic disk facing surface 152a. In this case, the film functions as a reinforcement. This method has an advantage that a desired area in the slit can be covered by a material with high mechanical strength.

The ramp 115 fabricated in the above-described manner is screwed onto a stage formed jutted out from a middle of a side wall of the base 102 as shown in FIG. 1. At this time, a part of the outer end of the magnetic disk 101 overlaps the slit 152 of the ramp 115. In this way, the HDD 100 equipped with the ramp 115 according to embodiments of the present invention is achieved.

Now referring to FIGS. 1 and 3, operation of the HDD 100 according to embodiments of the present invention will be described. In an unloading operation of the head slider 105, the actuator 106 pivots from above the recording area of the magnetic disk 101 toward the ramp 115, and the tab 116 contacts the first slope 501 of the tab slide 150 and rises on the first slope 501. After it has ascended the first slope 501, it moves along the parallel plane 501 and goes down on the second slope 503. After it has descended the second slope 503, it arrives at the parking area 504. When the actuator 106 has been unloaded to a retract position, the tab 116 is in contact with the parking area 504.

On the other hand, in a loading operation, the actuator 106 pivots toward the magnetic disk 101 and the tab 116 slides up along the second slope 503 from the parking area 504. Then, it moves across the parallel plane 502 toward the first slope 501, and slides down along the first slope 501. After the tab 116 has descended the first slope 501, the head is loaded to above the magnetic disk 101 keeping a specific fly-height.

If the HDD 100 receives an external impact during rotation of the magnetic disk 101, the magnetic disk 101 may oscillate even if the impact is relatively small. If the magnetic disk 101 oscillates like this, the rotating magnetic disk 101 may contact a wall of the slit 152 of the ramp 115.

In the ramp 115 of the present embodiment, if the magnetic disk 101 which passes through its slit 152 oscillates, the magnetic disk 101, as shown in FIG. 3, contacts the reinforcement 201 jutting toward the magnetic disk prior to the facing surface 152a on the slit 152. Since the reinforcement 201 is formed of polyetherimide resin with higher mechanical strength than the tab slide, the other parts including the tab slide are prevented from being scraped off.

If the oscillation of the magnetic disk 101 shows a complex behavior and its recording surface bends, the edge 101d can be prevented from contacting the area made of polyacetal resin because the groove 201 is provided at the area facing the edge 101d. A possibility for the ramp 115 according to the present embodiment to be scraped off is very small even if the rotating magnetic disk oscillates. In the HDD according to embodiments of the present invention equipped with the ramp 115, a rate for occurrence of data errors caused by spattered dusts on the recording area 101a of the magnetic disk 101 is low because dusts by the scraped ramp 115 are prevented from being generated.

An HDD with the ramp according to the present embodiment mounted and another HDD with a conventional ramp made of only polyacetal resin were prepared. Then, specific external impacts were applied to these HDDs in operation. Then, states of the recording surfaces of the inside magnetic disks were observed. The results are shown in the drawing-substitute photographs FIGS. 9 and 10.

Figure 9:
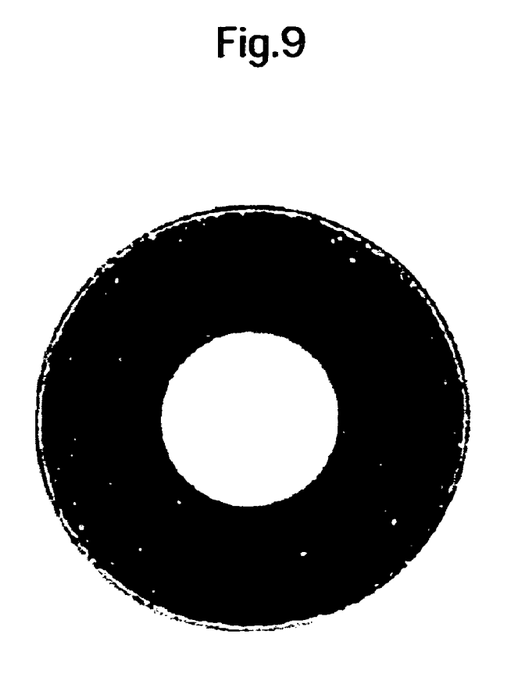
FIG. 9 is a drawing substitute photograph showing occurrence state of the dusts in the HDD with a conventional ramp.
Figure 10:
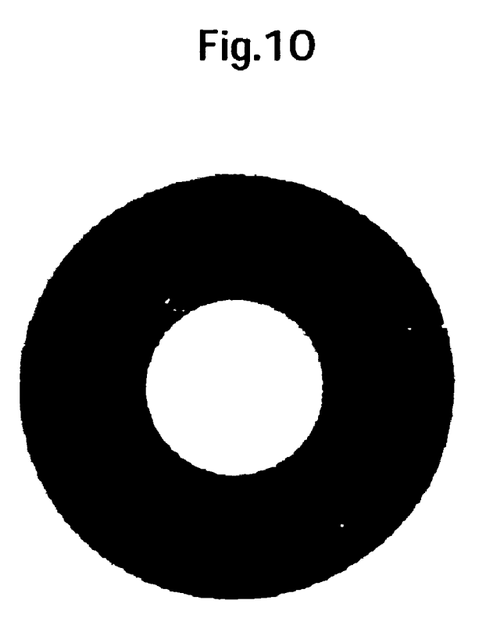
FIG. 10 is a drawing substitute photograph showing occurrence state of the dusts in the HDD with the ramp according to one embodiment.

FIG. 9 shows a magnetic disk of an HDD with a conventional ramp mounted and FIG. 10 shows a magnetic disk of an HDD with the ramp according to the present embodiment mounted. In these photographs, the doughnut-shaped black circular plates are the magnetic disks and the white spots thereon are the dust particles spattered over the recording surfaces 101a of the magnetic disks 101. As being apparent from this result, white spots are less in the ramp according to the present embodiment. That means that the ramp according to embodiments of the present invention is hard to be scraped in the event of contact with a rotating magnetic disk, and therefore the generation of dust can be prevented. A rate of error occurrence in the HDD with the ramp according to embodiments of the present invention is lower than in the HDD with the conventional ramp.

Even if a rotating magnetic disk comes in contact with it, the possibility for the ramp of embodiments of the present invention to cause a problem is lower than the conventional ramp, because it resists scrapes when the rotating magnetic disk oscillates to contact it. Thereby, the ramp of embodiments of the present invention can function as a limiter to limit an oscillation of the magnetic disk. Namely, if the magnetic disk starts to oscillate, the oscillation can be limited within the width of the slit. Although a data error sometimes occurs when the magnetic disk oscillates in reading or writing data, the ramp of embodiments of the present invention can limit the oscillation of the magnetic disk to effectively prevent occurrence of data error caused by the oscillation of the magnetic disk.

As set forth above, the present invention is described by way of example of a hard disk drive as a disk drive device but is not limited to the above embodiments. A person skilled in the art can easily modify, add, and convert the each element in the above embodiments within the scope of the present invention. For example, embodiments of the present invention are applicable to an optical disk drive having an optical recording medium inside thereof and a disk drive which houses an optical recording medium inside thereof and reads out recorded information on the recording medium, and its recording method is not particularly limited if it is a disk drive device meeting a disk-type recording medium. The shape and the location of the tab of the actuator are not limited to the above-described example, but the tab may be formed at the other area than the tip end of the actuator, for example. The location of the ramp in the HDD is not limited to the above-described example.

In the present embodiment, the reinforcement 201 is a terrace-shaped jutting out from the facing surface 152 of the slit 152 but is not limited to this shape. If a resin material with high mechanical strength is provided in the area where the magnetic disk may come in contact, it may be flat to the facing surface 152a. Especially, if the whole part forming the slit 152 can be formed of a material with high mechanical strength, the reinforcement needs not to be terrace-shaped. In this case, the whole area of the slit 152 facing the magnetic disk will become the reinforcement. The reason why the reinforcement is terrace-shaped is that the reinforcement should contact the magnetic disk prior to a part which is easily to be scraped off, if such a part is present on the facing surface 152.

In the present embodiment, the reinforcement 201 is provided outside of the dotted line D of the first virtual circle but is not limited to this structure. For example, the end of the reinforcement 201 may be located inside the first virtual circle. In this case, it becomes available to contact the magnetic disk in a larger area to reduce the contact pressure. The reinforcement may be disposed outside the second virtual circle which is outer than the first virtual circle. In this case, contact of the resin attached to the recording surface and the head can be effectively prevented.

In the present embodiment, as shown in FIG. 4 the planar shape of the reinforcement 201 is a substantial pentagon but it is not limited to this shape. For example, the reinforcement 201 may be provided all over the magnetic disk 101 facing surface 152a of the slit 152, or on the contrary, it may be provided in a part of the facing surface 152a. Namely, the shape of the reinforcement 201 may be arbitrary. If the reinforcement 201 overlaps the magnetic disk in a larger area as possible, the contact pressure can be reduced at the time of plane contact.

In the present embodiment, the oblique line 201b of the reinforcement 201 is linear, but may be a circular arc along the first virtual circle so that the corresponding part to the oblique line 201b of the reinforcement 201 gets closer to the dotted line D of the first virtual circle. If it is made to be along the second virtual circle, it should be a circular arc along the second virtual circle.

In the present embodiment, the reinforcement 201 is terrace-shaped and its cross-sectional shape is substantially rectangular, but it is not limited to this shape. For example, the cross-sectional shape may be substantially trapezoidal. That is, it is sufficient that the reinforcement is jutted out so as to contact first the oscillating magnetic disk and its cross-sectional shape is not specifically limited.

In the present embodiment, the groove 202 is provided in the area formed of polyacetal resin in the facing surface 152a of the slit 152, but it is not limited to this configuration. For example, a groove may be provided in the area facing the edge of the magnetic disk in the reinforcement 201. This enables to prevent a contact with the edge which brings high contact pressure on the reinforcement. On the contrary, no groove may be provided on the slit 152. In this case, the whole facing surface 152 is preferably formed of a resin material with high mechanical strength.

In the present embodiment, polyetherimide resin is used for the resin material with high mechanical strength and polyacetal resin is used for the resin with excellent sliding characteristics, but it is not limited to this configuration. As the resin with high mechanical strength, a resin material which has higher mechanical strength than the tab slide and an appropriate mechanical strength so as to scarcely be scraped off or so as not to scrape the magnetic disk if a rotating magnetic disk contacts it, may be used. For example, polyimide resin, polycarbonate resin, and the like are appropriate in addition to the polyetherimide resin. As the resin material with excellent sliding characteristic, a resin material may be used which has appropriate sliding characteristics to be able to slide the tab and to load/unload the head at a specific velocity. For example, liquid crystal polymer and the like are appropriate in addition to the polyacetal resin may be used.

What is claimed is:

1. A disk drive device comprising:
   an enclosure;
   a motor disposed in the enclosure for rotating a disk;
   an actuator for supporting a head for accessing the disk and for moving the head by pivoting; and
   a ramp for loading/unloading the head to/from the disk, the ramp comprising:
   a tab slide on which a tab of the actuator rides and slides;
   a slit through which an end of the rotating disk passes; and
   a reinforcement formed on an area facing the disk in the slit and made of a resin material with higher mechanical strength than the tab slide.

2. The disk drive device according to claim 1, wherein a shape of the reinforcement is a terrace shape jutting out toward the disk.

3. The disk drive device according to claim 1, wherein the reinforcement is provided at a position further outside in a radial direction of the disk than a first virtual circle which is an orbit of an outermost disk radial directional position of the head above a recording surface of the disk at a time of a first contact of the tab to the tab slide in unloading operation.

4. The disk drive device according to claim 1, wherein the reinforcement is provided at a position further outside in a radial direction of the disk than a second virtual circle which is an orbit of an outermost disk radial directional position of the head above a recording surface of the disk at a time when the tab rides on the tab slide and the head is lifted by more than a specific fly-height from the recording surface of the disk.

5. The disk drive device according to claim 1, wherein a shape of an end of the reinforcement in a direction toward a rotational axis of the disk is a shape along a circumference of the magnetic disk at a position of the end.

6. The disk drive device according to claim 1, wherein an end of the reinforcement in a direction toward the rotational axis of the disk is provided between a first virtual circle and a second virtual circle, the first virtual circle is an orbit of an outermost disk radial directional position of the head above a recording surface of the disk at a time of a first contact of the tab to the tab slide in unloading operation, and the second virtual circle is an orbit of the outermost disk radial directional position of the head above the recording surface of the disk at a time when the tab rides on the tab slide and the head is lifted by more than a specific fly-height from the recording surface of the disk.

7. The disk drive device according to claim 1, wherein a groove is provided in an area facing an edge of the disk end in the slit.

8. A ramp disposed in a disk drive device for loading/unloading a head for accessing a disk to/from the disk comprising:
a tab slide on which a tab of an actuator for supporting the head and moving the head by pivoting rides and slides;
a slit through which an end of the rotating disk passes; and
a reinforcement formed on an area facing the disk in the slit and made of a resin material with higher mechanical strength than the tab slide.

9. The ramp according to claim 8, wherein a shape of the reinforcement is a terrace shape jutting out toward the disk.

10. The ramp according to claim 8, wherein the reinforcement is provided at a position further outside in a radial direction of the disk than a first virtual circle which is an orbit of an outermost disk radial directional position of the head above a recording surface of the disk at a time of a first contact of the tab to the tab slide in unloading operation.

11. The ramp according to claim 8, wherein the reinforcement is provided at a position further outside in a radial direction of the disk than a second virtual circle which is an orbit of an outermost disk radial directional position of the head above a recording surface of the disk at a time when the tab rides on the tab slide and the head is lifted by more than a specific fly-height from the recording surface of the disk.

12. The ramp according to claim 8, wherein an end of the reinforcement toward a center of a rotational axis of the disk is shaped as an arc.

13. The ramp according to claim 8, wherein the end of the reinforcement in a direction toward the rotational axis of the disk is provided between a first virtual circle and a second virtual circle, the first virtual circle is an orbit of an outermost disk radial directional position of the head above a recording surface of the disk at a time of a first contact of the tab to the tab slide in unloading operation, and the second virtual circle is an orbit of the outermost disk radial directional position of the head above the recording surface of the disk at a time when the tab rides on the tab slide and the head is lifted by more than a specific fly-height from the recording surface of the disk.

14. The ramp according to claim 8, further comprising a groove in an area facing an edge of the disk end in the slit.

* * * * *